(12) United States Patent
Stygstra et al.

(10) Patent No.: US 10,349,623 B1
(45) Date of Patent: Jul. 16, 2019

(54) ANIMAL FEEDING STATION

(71) Applicants: Donna Stygstra, Holland, MI (US); Ronald Stygstra, Holland, MI (US)

(72) Inventors: Donna Stygstra, Holland, MI (US); Ronald Stygstra, Holland, MI (US)

(*) Notice: Subject to any disclaimer, the term of this patent is extended or adjusted under 35 U.S.C. 154(b) by 0 days.

(21) Appl. No.: 15/083,938

(22) Filed: Mar. 29, 2016

(51) Int. Cl.
 *A01K 5/00* (2006.01)
 *A01K 5/01* (2006.01)

(52) U.S. Cl.
 CPC .......... *A01K 5/00* (2013.01); *A01K 5/01* (2013.01); *A01K 5/0135* (2013.01)

(58) Field of Classification Search
 CPC .............. A01K 5/01; A01K 5/0135
 USPC ............... 119/61.5, 61.53, 61.54
 See application file for complete search history.

(56) References Cited

U.S. PATENT DOCUMENTS

| | | |
|---|---|---|
| 2,928,372 A | 3/1960 | Farley |
| D209,677 S | 12/1967 | Robert |
| D209,678 S | 12/1967 | Robert |
| D209,679 S * | 12/1967 | Robert .......... D30/133 |
| D217,360 S * | 4/1970 | Robert .......... D30/133 |
| 4,256,054 A | 3/1981 | Hitchcock |
| 4,735,171 A | 4/1988 | Essex |
| 5,564,363 A | 10/1996 | Soffici |
| 5,979,361 A | 11/1999 | Willinger |
| 6,363,885 B1 * | 4/2002 | Akins .......... A01K 5/01 119/51.01 |
| 6,581,541 B2 | 6/2003 | Hollinger |
| 6,786,177 B1 | 9/2004 | Lemkin |
| D590,551 S * | 4/2009 | Sperbeck .......... D30/129 |
| 7,832,356 B2 | 11/2010 | Kleinsasser |
| D659,297 S * | 5/2012 | Stygstra .......... D30/130 |
| D659,913 S * | 5/2012 | Spectre .......... D30/130 |
| D699,076 S * | 2/2014 | Harris .......... D30/130 |
| D722,407 S * | 2/2015 | Roslonski .......... D30/130 |
| D758,675 S * | 6/2016 | Breit .......... D30/130 |
| 2005/0039690 A1 | 2/2005 | Sage |
| 2010/0107984 A1 | 5/2010 | Uffner |

* cited by examiner

*Primary Examiner* — Yvonne R Abbott-Lewis
(74) *Attorney, Agent, or Firm* — King & Partners, PLC

(57) ABSTRACT

An animal feeding station including a base, and at least one compartment, wherein the at least one compartment is defined by a bottom portion, an inner surface of a sidewall, and a top lip, and wherein the at least one compartment is adapted to receive and contain a specially sized bowl.

2 Claims, 5 Drawing Sheets

ANIMAL FEEDING STATION

CROSS-REFERENCE TO RELATED APPLICATION(S)

Not Applicable

BACKGROUND OF THE INVENTION

1. Field of the Invention

The present invention relates in general to animal feeding stations and, more particularly, but not by way of limitation, to multi-compartment animal feeding stations for domestic animals such as cats and dogs that are configured to releasably contain this feeder's specially sized disposable bowls, which, in turn, receive and contain one or more food products and/or liquids therein. The animal feeding stations of the present invention also preferably include an antimicrobial topcoat to protect the animal from exposure to any potentially unsanitary conditions. The animal feeding stations of the present invention are further preferably fabricated from a large percentage of renewable resources and/or environmentally compatible resins, such as cellulosic fibers.

2. Background Art

Animal feeding stations and multi-compartment containers and are well known in the art and are the subject of numerous patents including, for example: United States Patent Application Publication No. 2010/0107984, entitled "Elevated Animal Feeding Apparatus," United States Patent Application Publication No. 2005/0039690, entitled "Animal Nourishment Bowl," U.S. Pat. No. 7,832,356, entitled "Feeder for Animals," U.S. Pat. No. 6,786,177, entitled "Animal Feeder with Storage Wells," U.S. Pat. No. 6,581,541, entitled "Pet Bowl with Suction Cup," U.S. Pat. No. 5,979,361, entitled "Non-skid Pet Bowl," U.S. Pat. No. 5,564,363, entitled "Pet Food Dish with Crawling Insect Barriers," U.S. Pat. No. 4,735,171, entitled "Animal Feeding Apparatus," U.S. Pat. No. 4,256,054, entitled "Pet Feeder," and U.S. Pat. No. 2,928,372, entitled "Dog Feeding Dish,"—all of which are hereby incorporated herein by reference in their entirety, including all references cited therein.

United States Patent Application Publication No. 2010/0107984 appears to disclose animal feeding devices, and more particularly elevated feeding stations for domestic animals such as dogs and cats. The devices are constructed and arranged to be used for pet feeding with or without riser legs and provide space saving features for shipping and storage. As a space saving feature, a dish retainer is provided with a first fastener system positioned under the dish retainer so that riser legs can be stored in a nested state with respect to each other and within the confines of a perimeter wall. A second fastener system is provided near the distal ends of the dish retainer for attachment of riser legs to elevate the dish retainer when desired.

United States Patent Application Publication No. 2005/0039690 appears to disclose an animal nourishment bowl including a triangular shaped perimeter having a first wall, a second wall in connection with the first wall, and a third wall in connection with the first wall and the second wall, and an apex located adjacent where the first wall connects with the third wall. The bowl includes a floor connected to the first wall, second wall and third wall in slanted relationship so the floor angles from the second wall down to the apex so that nourishment in the bowl has a tendency to move along the floor toward the apex under actions of the animal and gravity. The floor and walls define a container to hold the nourishment. A method for feeding an animal including the steps of pouring nourishment into a first bowl having a triangular shape and with a slanted floor where the nourishment collects at an apex of the bowl, which is the lowest point of the floor in the bowl relative to ground. The step of refilling the bowl with nourishment is also disclosed.

U.S. Pat. No. 7,832,356 appears to disclose a feeder for feeding animals at the weanling stage that has a trough with two opposed outwardly inclined front walls over which the animals can reach for taking feed from the trough and a feed hopper for discharging feed downwardly onto a shelf above the trough. Water is supplied into the trough so that the animals may take the feed dry on the shelf or wet from the trough. Water is normally supplied through a first water supply line which has a series of nipples controlled by the animals. However, while the weanlings are very young the first water supply line is closed off and water is supplied from a second supply line which is managed by a timer and water level sensor.

U.S. Pat. No. 6,786,177 appears to disclose an animal feeder, including a sturdy, molded plastic base, and a horizontally extending deck for receiving two or more water and food bowls, and legs or sidewalls secured to the deck for retaining the same in an elevated position. Recesses are defined in the deck to receive the bowls. Wells are formed in the interior of the base, and communicate with the recesses. In one preferred embodiment, the wells store limited quantities of dry food, or treats, below each recess so that the food may be accessed by removing the bowl. In an alternative embodiment, the wells are formed with ledges or lips that engage the covers of food containers for "wet" food. Access to the wells, or to the interior of the base of a two-component dog feeder, may be gained by removing the cover.

U.S. Pat. No. 6,581,541 appears to disclose a pet bowl having an interior dished portion for receiving pet food, water or the like that has a rather large suction cup held centrally to the underside of the pet bowl for securing the bowl to a surface such as a floor. The suction cup underlies at least a major portion of the lateral extent of the dished portion of the bowl, and may be held removably to the pet bowl by a bracket. The surface of the suction cup preferably has upstanding portions to engage the undersurface of the bracket to depress the suction cup assuredly upon downward movement of the bowl. The bracket may have a keyed opening, and a knob with an enlarged end that extends upwardly from the suction cup and may be fitted within the keyed opening to hold the suction cup removably to the bracket. Further, a tab may extend from the rim portion of the suction cup to be accessed through an opening in the sidewall of the pet bowl for enabling the rim of the suction cup to be lifted and release the suction cup from the floor.

U.S. Pat. No. 5,979,361 appears to disclose a non-skid pet bowl including a bowl having an undersurface. A layer of thermoplastic elastomer is disposed over the undersurface of the bowl, which provides the bowl with a non-skid lower surface. The non-skid pet bowl may be formed by a molding process that includes molding the bowl from a first material. Further, molding the layer of thermoplastic elastomer over the undersurface of the bowl, which provides a stronger bond between the bowl and the layer of thermoplastic elastomer.

U.S. Pat. No. 5,564,363 appears to disclose a single piece, single mold pet food dish designed for adaptation to out of doors environments where ants and other crawling insects tend to infect and degrade the food therein which has a water moat barrier formed between corrugated and alternating ridged rims, thereby effecting a superior elevational barrier to insect travel. In a preferred embodiment, a fluid inlet and fluid outlet port are provided to allow water in the moat to be in constant circulation.

U.S. Pat. No. 4,735,171 appears to disclose a feeding apparatus that includes a feeding dish dimensioned for receiving a predetermined single food portion and structure for receiving a quantity of food which is at least as great in quantity as a plurality of food portions and structure for delivering a single predetermined portion from the structure for receiving into the feeding dish. The structure for delivering includes structure for sensing the weight of the feeding dish and the associated food disposed therein and a timing mechanism. The structure for delivering operates when the feeding dish is substantially empty and in addition a predetermined interval has elapsed.

U.S. Pat. No. 4,256,054 appears to disclose a pet feeder that comprises a cabinet structure having a sloping internal partition dividing the cabinet into an upper bin for receiving food and a lower chamber. A metering cylinder is secured under an opening in the partition for receiving food for a pet. This cylinder has a circumferential slot intermediate its upper and lower ends and cooperates with upper and lower paddles vertically spaced on a common shaft and circumferentially displaced so that the lower paddle covers the bottom of the cylinder when the upper paddle is to one side of the cylinder. Rotation of the mounting shaft for the paddles causes the upper paddle to enter the circumferential slot and the lower paddle to leave the bottom of the cylinder so that the amount of food between the circumferential slot and bottom of the cylinder is metered downwardly into the chamber. A food tray is provided for receiving the food and also a water tray with a float valve is provided with access openings to the exterior of the cabinet. A master timer periodically operates a solenoid to move the paddles and thus meter the food.

U.S. Pat. No. 2,928,372 appears to provide a dog feeding dish. More particularly, the dog feeding dish appears to be fabricated from a single sheet of noncorrosive metal comprising: an open-topped bowl portion having a substantially flat horizontal bottom and a smooth rigid sloping side wall which diverges upwardly substantially uniformly from its junction with the bottom to its upper edge at an angle of not less than about twenty degrees with respect to the axis of the bowl portion; an outer skirt portion having a smooth rigid sloping side wall which has its upper edge encircling arid spaced from the top edge of the bowl portion and diverges downwardly substantially uniformly from its upper edge at an angle of not less than about twenty degrees with respect to the axis of the bowl portion; a pair of substantially horizontal upper and lower flanges, the upper flange providing a rim completely encircling the upper edge of the bowl portion and integrally concentrically joining the same with the top edge of the skirt portion, and the lower flange providing a base extending outwardly from and completely encircling the bottom of the skirt portion to enhance the stability of the dish; and a downwardly and inwardly curled bead on the periphery of the base flange; the underside of which lies in a substantially horizontal plane below the bottom of the bowl portion.

While the above described references appear to disclose single bodied and/or multi-compartment containers, none of the above-described references disclose a multi-compartment container that includes a base and two or more continuous sidewalls extending from the base to form at least partially hyperboloid shaped bowls that each comprise a compartment which are adapted to releasably retain this feeder's specially sized disposable bowls, which, in turn, receive and retain one or more food products and/or liquids therein. Moreover, none of the above-identified references disclose an animal feeding apparatus having an antimicrobial topcoat to protect the animal from exposure to any potentially unsanitary conditions. Furthermore, none of the above-identified references disclose an animal feeding station that is at fabricated from a large percentage of renewable resources and/or environmentally compatible resins, such as cellulosic fibers.

Therefore, it is an object of the present invention to provide a multi-compartment container that reduces and/or eliminates need to wash dirty pet dishes—among other drawbacks associated with presently available stations.

These and other objects of the present invention will become apparent in light of the present specification, claims, and drawings.

SUMMARY OF THE INVENTION

The present invention is directed to, in one preferred embodiment, an animal feeding station (e.g., a multi-compartment container) that includes a base and two or more continuous sidewalls extending from the base to form at least partially hyperboloid shaped bowls that each comprise a compartment which are adapted to releasably contain this feeder's specially sized disposable bowls (e.g., Dixie or Solo brand bowls, containers, etcetera), which, in turn, receive and contain one or more food products (e.g., dog food, cat food, etcetera) and/or liquids (e.g., water, milk, etcetera) therein. The present invention is also directed to an animal feeding station, comprising, consisting essentially of, and/or consisting of: (a) base; and (b) two continuous sidewalls extending from the base to form at least partially hyperboloid shaped bowls that each include a compartment adapted to receive and contain a specially sized disposable bowl.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

DETAILED DESCRIPTION OF THE INVENTION

Figure 1:
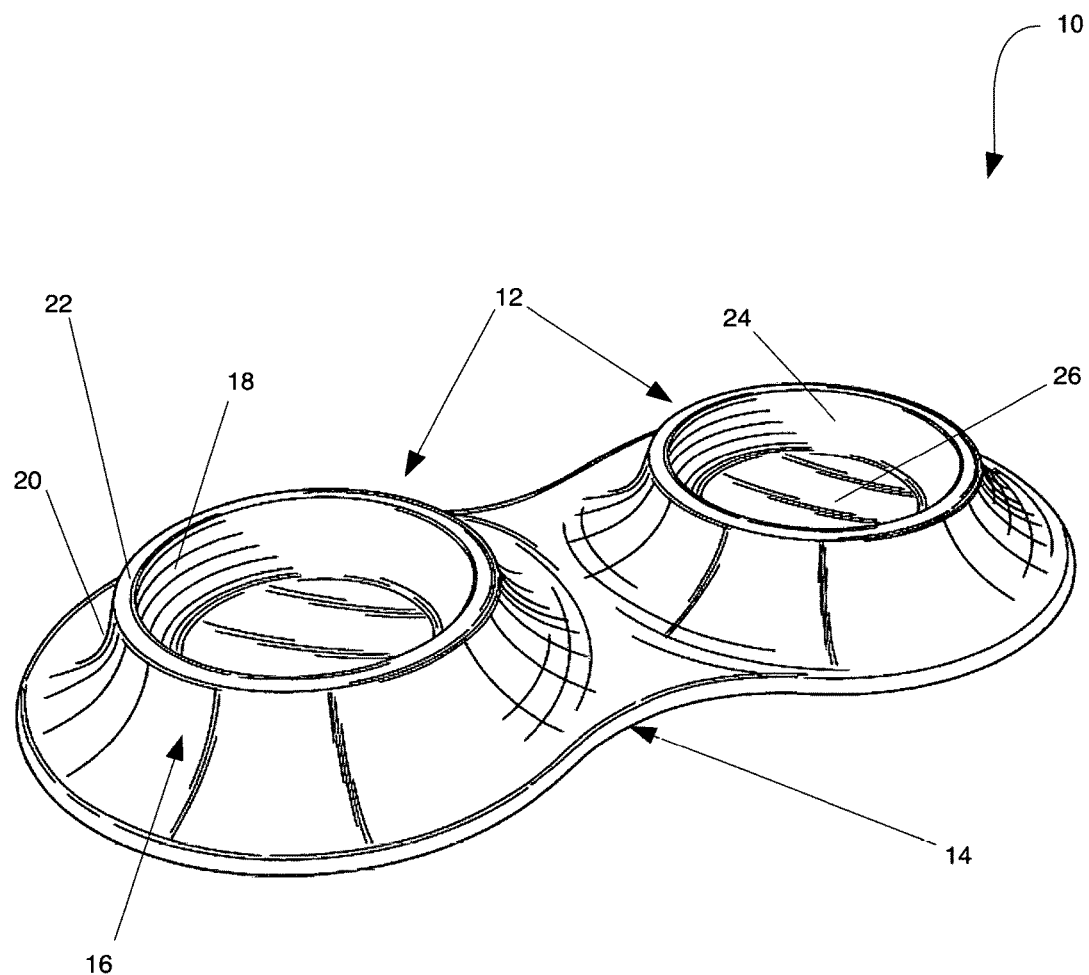
FIG. 1 of the drawings is a perspective view of an animal feeding station constructed in accordance with the present invention.

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

It will be further understood that FIGS. 1-5 are merely representations and/or illustrations of animal feeding stations. As such, some of the components may be distorted from their actual scale for pictorial clarity and/or image enhancement.

Figure 2:
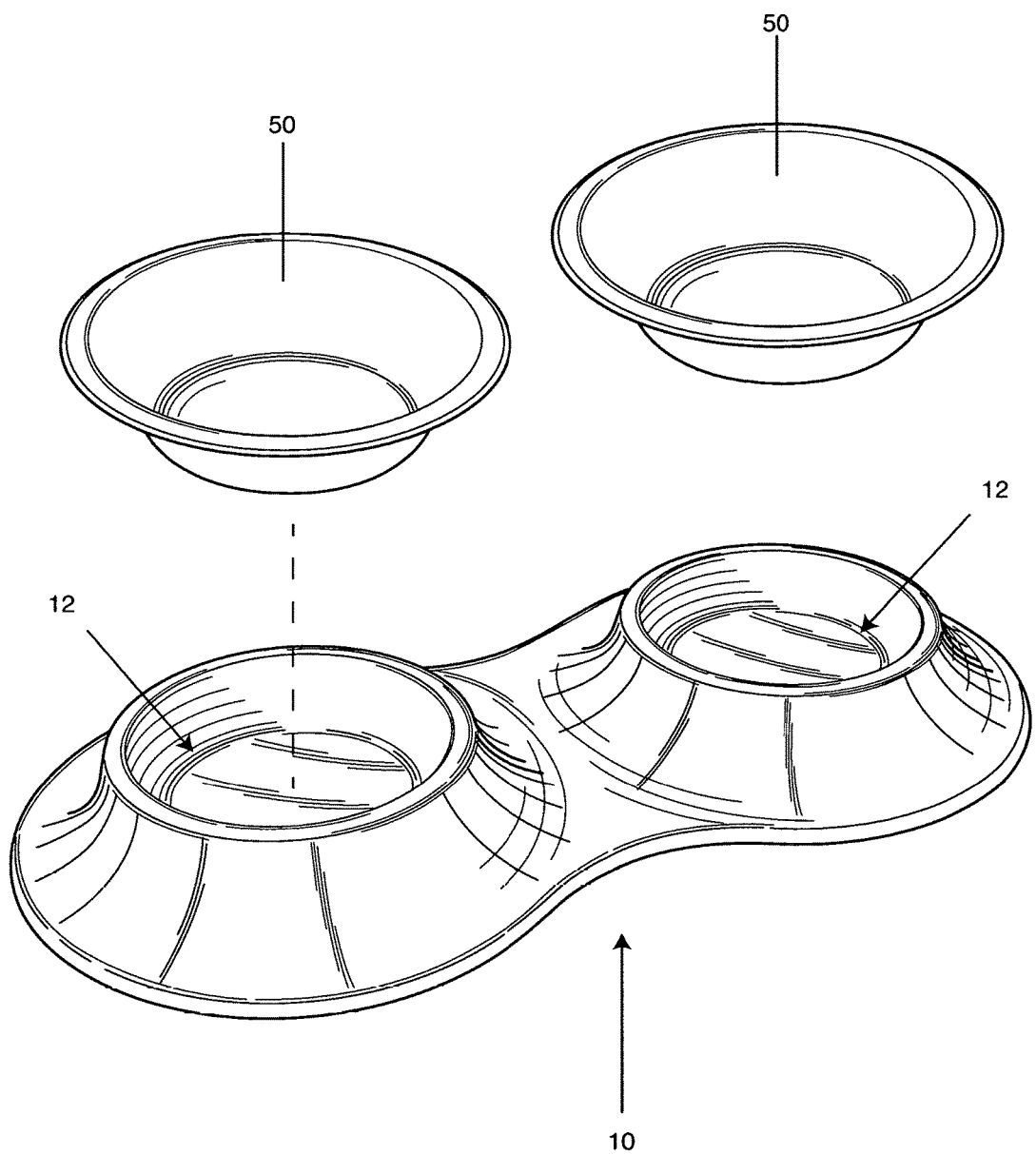
FIG. 2 of the drawings is a perspective view of an animal feeding station constructed in accordance with the present invention, showing a pair of disposable bowls releasably associated with the animal feeding station.
Figure 3:
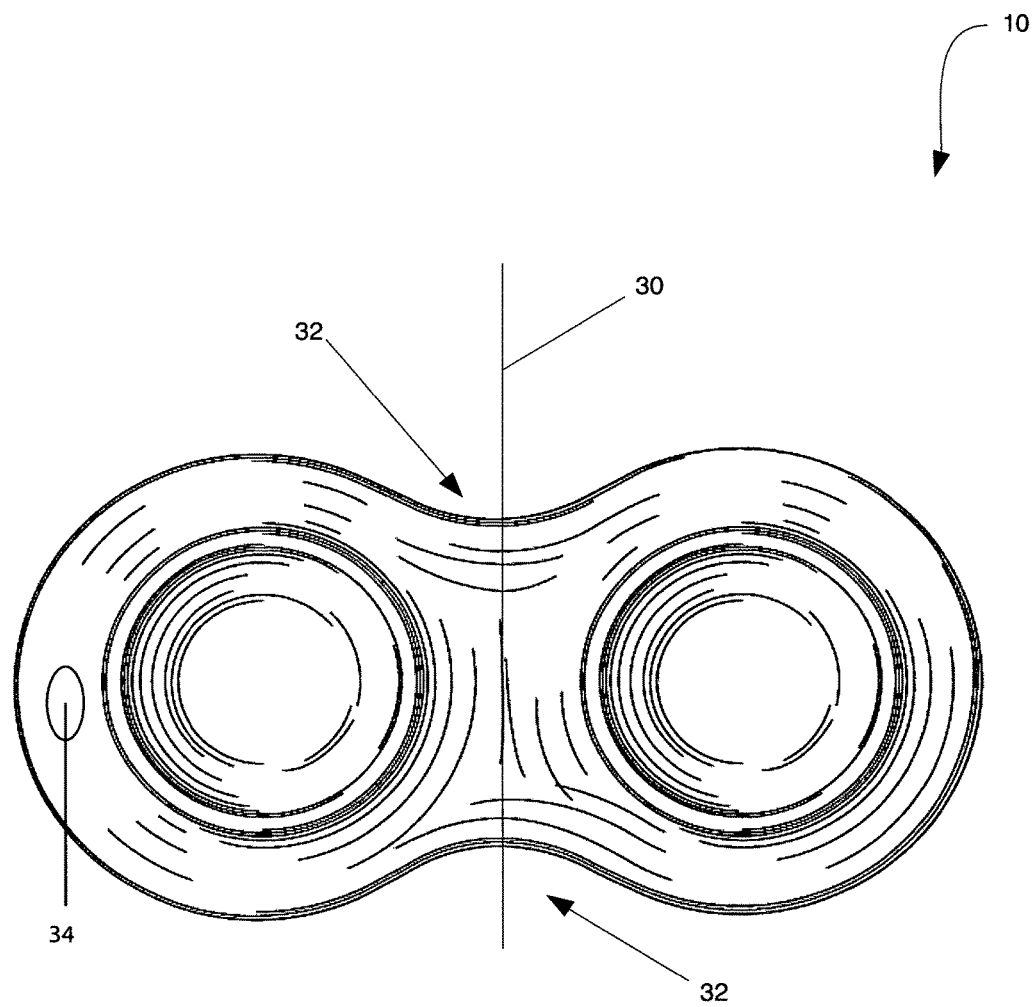
FIG. 3 of the drawings is a top plan view of an animal feeding station constructed in accordance with the present invention.
Figure 4:
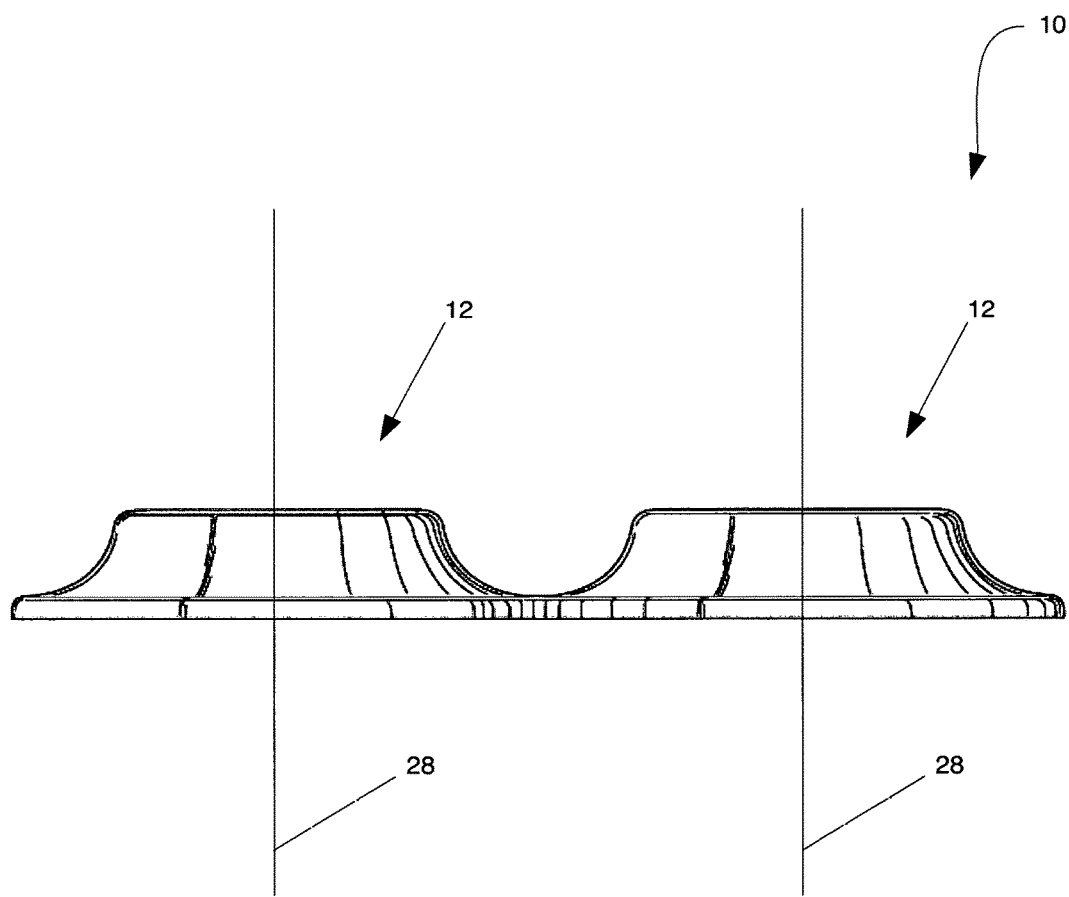
FIG. 4 of the drawings is a front elevational view of an animal feeding station constructed in accordance with the present invention.
Figure 5:
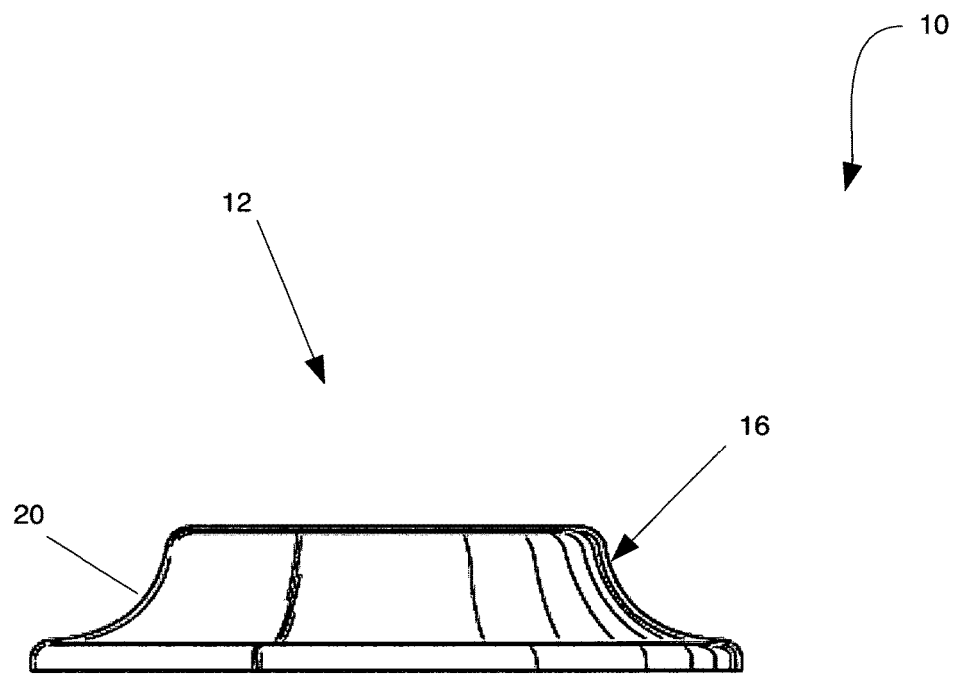
FIG. 5 of the drawings is a side elevational view of an animal feeding station constructed in accordance with the present invention.

Referring now to the collective drawings (i.e., FIGS. 1-5), animal feeding station 10 (e.g., a multi-compartment container) is shown as preferably comprising a unitary or single-piece station. As is best shown in FIG. 2, animal feeding station 10 is preferably disposed on a surface, such as a floor, and is adapted to releasably retain and/or contain this feeder's specially sized disposable bowls 50 (e.g., Dixie or Solo brand bowls, containers, etcetera) and/or other products, which, in turn, receive and retain one or more food products (e.g., dog food, cat food, etcetera) and/or liquids (e.g., water, milk, etcetera) in each of compartments 12.

Animal feeding station 10 is preferably fabricated from a first component that is a strong and resilient material such as, for example, natural and synthetic polymeric resins, plastics, rubbers, paper, metals, glass, and composites, or any combination thereof. In one embodiment of the present invention, animal feeding station 10 is constructed from impregnated with and/or coated with a waterproof, water resistant, or otherwise fluid impervious material. It will be understood that some of the materials utilized to fabricate animal feeding station 10 may also be a food grade material or coating applied to the outer surface of animal feeding station 10. In some embodiments of the present invention, animal feeding station 10 is preferably fabricated from a material that may be substantially impervious to one or more of: high temperature environments, chemicals (e.g., alcohols, chlorine, surfactants, detergents, emulsifiers, etcetera), UV light, or combinations thereof that may be utilized to sanitize or sterilize animal feeding station 10.

In another aspect of the present invention, animal feeding station 10 is preferably constructed from a disposable material such as paper, paper/plastic composites, and the like. The paper may be coated or impregnated with a waterproof, water resistant, or otherwise fluid impervious product to enhance the lifespan of animal feeding station 10.

Referring once again to FIGS. 1-5, animal feeding station 10 preferably includes base 14 that is substantially wider than the diameters of compartments 12 and may be defined by an outer peripheral geometry. Base 14 provides a stable support for compartments 12 and is configured to at least partially contact a surface (not shown). In some embodiments of the present invention, the outer peripheral geometry of base 14 comprises a substantially figure eight shape, defined in part by the sidewalls of compartments 12, as will be discussed in greater detail below. Base 14 preferably includes a predetermined height that determines, in part, the height that compartments 12 are spaced away from a surface (e.g., floor) on which animal feeding station 10 is disposed.

Each one of compartments 12 is preferably defined by continuous sidewall 16 that extends upwardly from and at a substantially parabolic angle from base 14 to form a bowl, well, and/or recess. In one embodiment of the present invention, animal feeding station 10 preferably includes two bowls disposed in spaced apart relationship. It will be understood that sidewall 16 includes inner surface 18 and outer surface 20.

According to some embodiments of the present invention, sidewall 16 is a shape representative of at least a portion of a hyperboloid of one sheet extending between top lip 22 of sidewall 16 and base 14. Top lip 22 has a given diameter that defines the widest portion of compartment 12. According to the present disclosure, inner surface 18 is shaped to form parabolic side portion 24 and substantially flat bottom portion 26. It will be understood that in some embodiments inner surface 18 of compartment 12 may be substantially semi-circular and concave in shape such that the lowest point of compartment 12 is substantially axially aligned with central axis 28 of compartment 12. This configuration encourages products within compartment 12 to funnel towards central axis 28 of compartment 12 rather than clinging to inner surface 18 of sidewall 16.

In some embodiments, animal feeding station 10 includes two compartments 12 disposed adjacent to one another. Compartments 12 may be identical in shape and size to one another or may vary in size and/or shape relative to one another. Sidewalls 16 of compartments 12 may at least partially intersect one another along midline 30 of animal feeding station 10 giving rise to the substantially figure eight shape of base 14. The substantially figure eight shape of base 14 defines arcuate portions 32. It will be understood that as the distance between compartments 12 increases, the thickness of the intersection point between compartments 12 may decrease, which in turn increases the depth of arcuate portions 32.

Additionally, while animal feeding station 10 has been disclosed as comprising two adjacent compartments 12, animal feeding station 10 may include any one of a number of compartments 12 defined by sidewalls 16. As such, the outer peripheral geometry of base 14 may change depending on the number of compartments 12 of animal feeding station 10.

Animal feeding station 10 preferably includes one or more anti-slip components designed to engage a surface that container 10 is placed upon, to prevent animal feeding station 10 from undesired movement relative to the same. In one embodiment, animal feeding station 10 may include a continuous or semi-continuous strip of anti-slip material disposed under the outer peripheral edge of base 14.

Additionally, as is best shown in FIG. 2, compartments 12 of animal feeding station 10 may be adapted to releaseably receive a liner, such as bowl 50, that may be removed and replaced as necessary. Indeed, such a configuration enables a user to maintain animal feeding station 10 in a generally clean and sanitary condition without continuous and/or repetitive cleaning.

In one embodiment of the present invention, animal feeding station 10 is preferably fabricated from and/or comprises a first component and an optional second component. The first component preferably comprises a plastic and/or thermoplastic and an optional binding agent, and the second component preferably comprises a natural rubber, a synthetic rubber, a thermoplastic rubber, and/or a thermoplastic elastomer.

In one embodiment, the thermoplastic of the first component preferably comprises a poly(methyl methacrylate), an acrylonitrile butadiene styrene, a polyamide, a polylactic acid, a polybenzimidazole, a polycarbonate, a polyether sulfone, a poly ether-ether ketone, a polyetherimide, a polyethylene, a polyphenylene oxide, a polyphenylene sulfide, a polypropylene, a polystyrene, a polyvinyl chloride, and/or a polytetrafluoroethylene.

In accordance with the present invention, the binding agent of the first component preferably comprises sucrose, lactose, starch, cellulose, cellulosic fiber, modified cellulose, microcrystalline cellulose, cellulose ether, hydroxypropyl cellulose, sugar alcohol, gelatin, and/or collagen.

In one embodiment of the present invention, the thermoplastic of the first component (e.g., polypropylene) is present in a concentration ranging from approximately 50 percent by weight to approximately 95 percent by weight of the first component, and the binding agent (e.g., starch, cellulosic fiber) is present in a concentration ranging from approximately 5 percent by weight to approximately 50 percent by weight of the first component.

In another aspect of the present invention, the ratio (by weight) of the thermoplastic to the binding agent ranges from approximately 10:1 to approximately 2:1 (and more preferably approximately 5:1 to approximately 3:1).

The optional second component of animal feeding station 10 preferably comprises a styrenic block copolymer, a thermoplastic polyolefin elastomer, a thermoplastic vulcanisate, a thermoplastic polyurethane elastomer, a melt processable rubber, a thermoplastic polyester elastomer, and/or a thermoplastic amide elastomer. Preferably, the second component (e.g., thermoplastic polyolefin elastomer) comprises a density ranging from approximately 0.75 g/cm$^3$ to approximately 0.95 g/cm$^3$, and more preferably comprises a density ranging from approximately 0.84 g/cm$^3$ to approximately 0.89 g/cm$^3$.

Furthermore, the second component (e.g., thermoplastic polyolefin elastomer) preferably comprises a Tg ranging from approximately −35 degrees centigrade to approximately −75 degrees centigrade, and more preferably comprises a Tg ranging from approximately −40 degrees centigrade to approximately −60 degrees centigrade.

Preferred second component thermoplastic polyolefin elastomers include, for example, ENGAGE 7270, ENGAGE 7277, ENR 7380, ENGAGE HM 7387, ENGAGE 7447, ENGAGE 7467, ENGAGE 8003, ENGAGE 8100, ENGAGE 8107, ENGAGE 8130, ENGAGE 8137, ENGAGE 8150, ENGAGE 8157, ENGAGE 8180, ENR 8187, ENGAGE XLT 8677, ENGAGE 8200, ENGAGE 8207, ENGAGE 8400, ENGAGE 8407, ENGAGE 8842, ENGAGE HM 7487, DOW VLDPE 1085, ENGAGE HM 7280, DOW VLDPE 1095, ENGAGE HM 7289, NORDEL IP 3720P, NORDEL IP 3745, and/or AMPLIFY GR 216.

In accordance with the present invention, the first component and the second component may also optionally include one or more adjunct agents such as, a solvent (e.g., polar and/or non-polar solvent) an anti-microbial agent (e.g., anti-microbial component, layer and/or topcoat 34), a scent, and a colorant.

In accordance with the present invention, anti-microbial agents comprise chemical compositions that at least substantially inhibit microbial growth and/or kill bacteria, fungi and/or other microorganisms. A plurality of inorganic and/or organic chemical compositions which display anti-microbial activity are suitable for use with the present invention. Non-limiting examples of suitable organic substances that possess anti-microbial activity are carboxylic acids, alcohols and/or aldehydes, most of which appear to act by protein precipitation and/or by disruption of microbial cell membrane.

In one embodiment of the present invention, the anti-microbial activity of suitable inorganic substances is generally related to the ions, toxic to other microorganisms, into which they dissociate. The anti-microbial activity of various metal ions, for example, is often attributed to their affinity for protein material and the insolubility of the metal proteinate formed. Metal-containing salts are thus preferred among the inorganic substances that act as anti-microbial agents.

Metal inorganic salts, including simple salts of metal cations and inorganic anions like silver nitrate, are often soluble and dissociable and, hence, offer ready availability of potentially toxic ions.

Metal salts or complexes of organic moieties such as organic acids, on the other hand, are often less soluble and, therefore, are less dissociable than the soluble metal inorganic salts. Metal organic salts or complexes generally have a greater stability with respect to extraneous organic matter, and anions present in the environment of the living cell than metal inorganic salts, but have less toxic potential by virtue of their greater stability.

Silver ion is an example of a preferred metal ion which possess anti-microbial activity. To the best of Applicant's knowledge silver ions react with a variety of anions as well as with chemical moieties of proteins. Precipitation of proteins, causing disruption of the microbial cell membrane and complexation with DNA, is likely the basis of the anti-microbial activity. Silver ions in high concentration will form insoluble silver chloride and thereby deplete chloride ions in vivo.

Anti-bacterials are antiseptics that have the proven ability to act against bacteria. Non-limiting examples of anti-bacterials suitable for use in accordance with the present invention include alcohols such as ethanol (20-99$^+$%), 1-propanol (20-99$^+$%) and 2-propanol/isopropanol (20-99$^+$%) or mixtures of these alcohols. They are commonly referred to as "surgical alcohol". Used to disinfect the skin before injections are given, often along with iodine (tincture of iodine) or some cationic surfactants (benzalkonium chloride 0.05-0.5%, chlorhexidine 0.2-4.0% or octenidine dihydrochloride 0.1-2.0%). Other common anti-bacterials include quaternary ammonium compounds known as Quats or QAC's, include the chemicals benzalkonium chloride (BAC), cetyl trimethylammonium bromide (CTMB), cetylpyridinium chloride (Cetrim, CPC) and benzethonium chloride (BZT). Benzalkonium chloride is used in some pre-operative skin disinfectants (conc. 0.05-0.5%) and antiseptic towels. The anti-microbial activity of Quats is inactivated by anionic surfactants, such as soaps. Related disinfectants include chlorhexidine and octenidine.

It will be understood that the first component and/or the second component may be single or double sidedly dip or spray coated with the anti-microbial, anti-bacterial, and/or anti-viral agent, or alternatively one or both components may be impregnated with one or more of the aforementioned agents.

Animal feeding stations 10 of the present invention may be injection molded, blow molded, cast, turned, or vacuum formed, among others, to create a container having one or more compartments for receiving and retaining a product.

Moreover, to reduce the cost of manufacture, animal feeding station 10 may be fabricated utilizing vacuum forming processes where animal feeding station 10 is fabricated from a sheet of plastic drawn over a positive or negative mold of animal feeding station 10. Fabricating animal feeding station 10 via a vacuum molding process that utilizes a sheet of plastic having a given thickness ensures that the overall thickness of a substantial portion of animal feeding station 10 is uniform. Animal feeding station 10 may be constructed to be as lightweight as possible by varying the thickness of the sheet of plastic. It will be understood that manufacturers may balance a desired weight of animal feeding station 10 against a desired durability profile of animal feeding station 10 to arrive at a particular thickness that results in the desired container profile, keeping in mind that as the thickness of the sheet of plastic decreases, the strength of animal feeding station 10 may decrease.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An animal feeding station, comprising:
   a ground engaging substantially figure eight shaped base;
   a first compartment adapted to receive and contain a product, wherein the first compartment includes a bottom surface, a top lip, and a continuous inner sidewall extending upward from the bottom surface to the top lip to form an at least partially hyperboloid shaped bowl;
   a second compartment adapted to receive and contain a product, wherein the second compartment includes a bottom surface, a top lip, and a continuous inner sidewall extending upward from the bottom surface to the top lip to form an at least partially hyperboloid shaped bowl; and
   an anti-microbial topcoat applied to the base, the first compartment, and the second compartment, wherein the anti-microbial topcoat comprises silver ion.

2. An animal feeding station, comprising:
   a ground engaging substantially figure eight shaped base;
   a first compartment adapted to receive and contain a product, wherein the first compartment includes a bottom surface, a top lip, and a continuous inner sidewall extending upward from the bottom surface to the top lip to form an at least partially hyperboloid shaped bowl;
   a second compartment adapted to receive and contain a product, wherein the second compartment includes a bottom surface, a top lip, and a continuous inner sidewall extending upward from the bottom surface to the top lip to form an at least partially hyperboloid shaped bowl;
   wherein the animal feeding station is fabricated from a first component and a binding agent, wherein the first component comprises a plastic and the binding agent comprises cellulosic fiber; and
   wherein an anti-microbial topcoat is applied to the base, the first compartment, and the second compartment, and wherein the anti-microbial topcoat comprises silver ion.

* * * * *